US006888819B1

(12) United States Patent
Mushkin et al.

(10) Patent No.: US 6,888,819 B1
(45) Date of Patent: May 3, 2005

(54) MEDIA ACCESS CONTROL UTILIZING SYNCHRONIZATION SIGNALING

(75) Inventors: Mordechai Mushkin, Nirit (IL); Dan Raphaeli, Kfar Saba (IL)

(73) Assignee: Yitran Communications Ltd., Beer Shewa (IL)

(*) Notice: Subject to any disclaimer, the term of this patent is extended or adjusted under 35 U.S.C. 154(b) by 766 days.

(21) Appl. No.: 09/679,330

(22) Filed: Oct. 4, 2000

(51) Int. Cl.[7] .......................... H04J 3/06; H04L 12/413; H04L 12/43; G06F 1/12

(52) U.S. Cl. ....................... 370/350; 370/445; 370/459; 370/510; 713/400

(58) Field of Search ................................ 370/350, 442, 370/445, 458–459, 478, 480, 503, 507, 509–510, 515–516, 520; 713/400, 500–501, 600

(56) References Cited

U.S. PATENT DOCUMENTS

| | | | | | |
|---|---|---|---|---|---|
| 4,672,606 | A | * | 6/1987 | Bourgonje et al. | 370/445 |
| 5,107,490 | A | * | 4/1992 | Wilson et al. | 370/404 |
| 5,416,780 | A | * | 5/1995 | Patel | 370/347 |
| 5,448,593 | A | | 9/1995 | Hill | 375/367 |
| 5,450,404 | A | | 9/1995 | Koopman et al. | 370/85.2 |
| 5,572,517 | A | * | 11/1996 | Safadi | 370/431 |
| 5,586,117 | A | * | 12/1996 | Edem et al. | 370/466 |
| 5,648,959 | A | * | 7/1997 | Ilyadis et al. | 470/445 |
| 5,974,056 | A | * | 10/1999 | Wilson et al. | 370/509 |
| 5,987,024 | A | * | 11/1999 | Duch et al. | 370/350 |
| 6,442,145 | B1 | * | 8/2002 | De Lange et al. | 370/310 |
| 6,577,630 | B1 | * | 6/2003 | Markwalter et al. | 370/392 |
| 6,671,284 | B1 | * | 12/2003 | Yonge et al. | 370/462 |

OTHER PUBLICATIONS

Philip J. Koopman et al., "Time Division Multiple Access Without a Bus Master", United Technologies Research Center, UTRC Technical Report RR–9500470, Jun. 30, 1995.

ESTI, ISDN, UNI Layer 1 Specification, v1.22, pp. 19–20.

* cited by examiner

*Primary Examiner*—John Pezzlo
*Assistant Examiner*—Saba Tsegaye
(74) *Attorney, Agent, or Firm*—Zaretsky & Associates PC; Howard Zaretsky

(57) ABSTRACT

A novel media access control (MAC) mechanism utilizing synchronization signaling that enables nodes from different networks having different technologies and protocols to coexistence using the same shared media. The present invention is suitable for use with a wide range of different types of network and technologies and is particularly useful in providing coexistence capabilities to powerline based data communication systems. Specific time slots are assigned for the transmission of a frame occupation signal to indicate to all nodes that the channel is occupied. A synchronization signal is randomly transmitted during a preassigned time slot within the frame to provide accurate timing for the frame occupation signal. During times that a node does not transmit the synchronization signal, it listens to the channel. A timing signal is derived from the synchronization signals received from other nodes during this quiet period wherein the node is in a listening mode. The node then adjusts its internal clock in accordance with the derived timing signal.

43 Claims, 10 Drawing Sheets

MEDIA ACCESS CONTROL UTILIZING SYNCHRONIZATION SIGNALING

FIELD OF THE INVENTION

The present invention relates generally to data communication systems and more particularly relates to an apparatus for and a method of controlling access to a communications media.

BACKGROUND OF THE INVENTION

Carrier Sense Multiple Access (CSMA) is a well-known media access mechanism, which is used for example in Ethernet LANs (IEEE Standard 802.3) and wireless LANs (IEEE Standard 802.11). These network technologies are commonly used in networks that comprise shared media whereby multiple nodes simultaneously have access to the same media. The media may be any physical medium that can be simultaneously shared by many nodes, such as a cable, RF, powerline, etc.

Several examples of prior art shared networks are shown in FIGS. 1A to 1D. Referring to FIG. 1A, the network, generally referenced 10, comprises a plurality of communication nodes 12 (nodes A through E) that are connected to a common physical media. Each node 12 is connected to a shared media 14. An example of a shared media is the AC powerline wiring grid found in homes, offices and factories. In a residential environment, groups of neighboring residences are coupled together via the outdoor wiring, thus forming a huge common media. Note that the powerline media remains shared until reaching a transformer where signals cannot easily propagate beyond without signal couplers.

A shared media such as the powerline is typically characterized by a large variety of different signal propagation conditions. In many cases, portions of the media are invisible from other parts creating hidden node situations.

In many cases, a home, enterprise or other premise includes more than one communication network. Each communication network may be made up of a plurality of nodes with each network comprising at least two nodes. All nodes of the same network implement the same communication technique and are able to communicate with each other thus permitting interoperability (assuming that the propagation conditions over the media enable communication). Nodes from different networks may implement different communications techniques, in which case they are not able to communicate with each other. In addition, the propagation characteristics of the shared media (e.g., the powerline grid) may have large variations and irregularities. This results in large variations in the attenuation over the communication path between two given nodes. In addition, the propagation characteristics of the shared media (e.g., the powerline grid) may have large variations and irregularities. This results in large variations in the attenuation over the communication path between two given nodes.

Since the powerline grids of neighboring residences are physically connected via the power distribution network, the common media of FIG. 1A might refer to the powerline grid of a single residence or to the powerline grids of several neighboring residences (e.g., several apartments in a building).

In a configuration such as in FIG. 1A, reliable efficient communications between the nodes is usually possible only if one node transmits at a time, in order that the transmission from one node does not interfere with the transmission from another node. Therefore, there is a need for a media access mechanism that enables nodes to share the media without interfering with each other. This applies to nodes of the same network as well as to nodes of different networks.

Thus, it is desirable to have nodes that belong to different networks but share a common media be able to coexist with each other. Coexistence, i.e. media sharing, entails nodes from one network that desire to communicate with nodes from another network refraining from initiating new transmissions until the ongoing transmission is complete. Nodes from different networks, however, typically utilize different communication protocol stacks, thus preventing them from detecting and understanding each other's messages (typically within the Physical layer).

In a network incorporating prior art CSMA like media sharing, a node that desires to transmit, captures the media by the mere transmission of the data message or by transmitting before or along with the data message a predefined signal or message. As long as the media is captured, no other node is permitted to transmit.

In basic CSMA, a node that desires to transmit listens to the media to determine whether any other node is transmitting and transmits only when the media is free. A variety of prior art carrier sense mechanism have been developed including physical carrier sense and virtual carrier sense.

The principle of physical carrier sense is the direct detection of carrier signal energy. The actual transmission is continuously detected as long as it exists, hence the derivation of the term 'carrier sense.' This mechanism is incorporated in the IEEE 802.3 Ethernet LAN standard. It is suitable for applications where every node is capable of determining whether any other node is transmitting.

This carrier sense mechanism, however, has the disadvantage of poor reliability in noisy channels where real signal cannot always be discerned from noise. In addition, it does not permit the coexistence of nodes having different technologies. Further, the mechanism is susceptible to the hidden node problem which is described below.

Virtual carrier sense is another prior art carrier sense mechanism that is incorporated, in addition to physical carrier sense, in the IEEE 802.11 wireless LAN standard. In this scheme, the determination of the media status is logical rather than physical whereby the status of the media is determined using special control messages that specify the duration of the upcoming transmission. The control message is typically transmitted robustly at high power and using a low data rate to maximize detection by nodes.

Although this technique improves the reliability over the physical carrier sense mechanism, it still has the disadvantages of (1) not permitting the coexistence of nodes incorporating different technologies and (2) suffering from the hidden node problem.

The basic carrier sense mechanism, whether physical or logical, has several disadvantages when implemented over some types of media, especially shared powerline and wireless media. One major limitation is known as the hidden node problem and is illustrated in FIG. 1B.

Referring to FIGS. 1B, 1C and 1D, the propagation conditions over the shared media are assumed to be such that adjacent nodes, e.g., nodes A and B, B and C, C and D, D and E, are able to hear one another. Non adjacent nodes, e.g., nodes A and C, are unable to hear each other. Further, assume that the media attenuation characteristics are such that simultaneous transmissions from two neighboring nodes interfere with each other. For example, simultaneous transmissions from nodes A and C interfere at node B such that node B is not aware of the transmissions. Note that the terms 'adjacent' and 'neighboring', as used in the descriptions of FIGS. 1B, 1C and 1D, refer solely to the alphabetic order of the letters indicating the nodes (i.e. A, B, C, D and E) and to the location of the nodes depicted therein. It does not necessarily imply any relationship with the physical location of the actual nodes.

The hidden node problem is described as follows. Assume node A is transmitting to node B. Node C is unaware of the transmissions due to the propagation conditions of the example, i.e. it is 'hidden' from node A. Meanwhile, node C begins transmitting to node D resulting in a disturbance in reception at node B.

The virtual carrier sense with RTS-CTS attempts to solve the hidden node problem. The mechanism involves source and destination nodes exchanging a pair of special control messages (i.e. RTS and CTS), which are adapted to indicate the length of the upcoming transmissions. Any other node that detects these control messages knows that the media is going to be occupied for the time duration specified in the control messages.

Referring to FIG. 1C, in accordance with the prior art virtual carrier sense with RTS-CTS mechanism, nodes A and B exchange RTS-CTS messages. Node C detects the CTS signal generated by node B and refrains from transmitting, thus solving the hidden node problem.

Although this mechanism does solve the hidden node problem, it does not permit nodes with different technologies to coexist. Another limitation to the RTS-CTS mechanism it that there are hidden node situations that the mechanism does not solve, e.g., the example described below, which is referred to as the 'mask node' problem.

The mask node problem is described with reference to FIG. 1D. Assume node A is transmitting to node B and node D is transmitting to node E. Because node D is transmitting, node C does not detect the CTS message transmitted from node B. Therefore there is the danger that if node D stops transmitting while node A is still transmitting, node C might start transmitting and disturb the reception at node B. Note that the term 'data transmission' is intended to represent any type of transmission including data, control, etc. and is not intended to limit the type of transmission.

Note that in this mechanism full time carrier sense is replaced with signaling at the beginning of the message body only. The problem, as illustrated here, is that if a node misses the signaling for some reason, it may be unable to detect the virtual carrier signaling at a later time. In addition, the mechanism requires that all nodes implement the same communication technology in order that every node will be able to detect, decode and understand the control messages generated by other nodes.

SUMMARY OF THE INVENTION

The present invention is a media access control (MAC) mechanism that utilizes synchronization signaling to enable nodes from different networks having different technologies and protocols to coexist using the same shared media. The present invention is suitable for use with a wide range of different types of network and technologies and is particularly useful in providing coexistence capabilities to powerline based data communication systems and wireless LAN systems. Wireless and powerline media are typically characterized by a large variety of propagation paths and conditions resulting in the increased likelihood of hidden node and mask node problems.

The media access control mechanism of the present invention provides a solution to the communication problems imposed by the characteristics of the powerline media, e.g., the hidden node and mask node problems described previously. In addition, the MAC mechanism enables the efficient coexistence of nodes that employ different communication technologies. Thus, multiple networks attached to the shared media can coexist regardless of the particular technology they use. This makes the choice of network technology for one network independent of the choice for another network wherein both networks share the same media.

The media access control mechanism comprises assigning specific time slots for the transmission of a busy signal (or frame occupation signal), which functions to indicate to all nodes that hear it that the media channel is occupied. The frame occupation signaling is transmitted periodically at the same time during each frame. A node refrains from initiating a new transmission if it detects the frame occupation signal. A node begins transmission only after it ceases to detect a frame occupation signal.

In order to provide common timing for the frame occupation signal, a distributed synchronization mechanism is implemented. In accordance with the mechanism, each node is adapted to transmit on a random basis, a synchronization signal during a preassigned time slot during the frame. During times that a node does not transmit the synchronization signal, it listens to the media. A timing reference signal is derived from the synchronization signals received from other nodes during these listening periods. The node then adjusts its internal clock in accordance with the derived timing reference signal.

The invention also provides a mechanism to converge the synchronization between two disparate groups of nodes, in case that a new bridge node is introduced. The bridge node, upon detecting more than one synchronization signal, transmits multiple synchronization signals that are skewed so as to cause the nodes listening to shift their average synchronization times toward a single point in time. Once convergence is achieved, the bridge node can begin transmitting data.

A generic node device that incorporates the media access controller of the present invention is described. The device combines media coupling circuitry, transmitter circuitry, receiver circuitry and an application processor with the media access controller constructed in accordance with the present invention.

There is therefore provided in accordance with the present invention a method of synchronization between a plurality of nodes connected to a media, each node including a clock, the method comprising the steps of listening to the media for a predetermined length of time while attempting to detect synchronization signals from other nodes, if synchronization signals are detected, deriving a timing signal from the synchronization signals, aligning the clock in a particular node in accordance with the timing signal, transmitting synchronization signals into the media on a random basis at specific points in time, maintaining synchronization with other nodes by listening to the media when the synchronization signal is not transmitted and attempting to detect synchronization signals transmitted by other nodes and if synchronization signals are not detected, transmitting synchronization pulses onto the media on a random basis at particular points in time and waiting for other nodes to join the network.

There is also provided in accordance with the present invention a method of media capture by a node connected to a media and adapted to run a protocol, the method comprising the steps of determining whether the media is available, if the media is not available, waiting until the media is available before starting a new transmission, once the media is available, establishing a connection between a source node and a destination node in accordance with the protocol, transmitting a frame occupation signal from both the source node and the destination node and if the connection was successfully established, maintaining the connection by periodic transmission of the frame occupation signal by the source node and the destination node.

In addition, there is provided in accordance with the present invention a media access controller for controlling access by a node to a media connected thereto comprising a synchronization signal generator adapted to randomly generate a synchronization signal and subsequently transmit the synchronization signal onto the media during a predetermined synchronization time slot, a synchronization mechanism adapted to achieve synchronization between a particular node and other nodes, the synchronization mechanism operative to control the generation of the synchronization signal by the synchronization signal generator, a timing mechanism operative to produce a timing signal derived from a plurality of received synchronization signals, a frame occupation signal generator adapted to generate a frame occupation signal when the node obtains access to the media and a media access controller for coordinating access to the media, wherein access to the media is not permitted as long as the presence of a frame occupation signal is detected on the media.

There is further provided in accordance with the present invention a method of converging disparate synchronizations from a plurality of networks, the method comprising the steps of listening for synchronization signals, if more than one synchronization signal is detected, transmitting a synchronization signal shifted in time for each group of synchronization signals detected, nodes in each network adjusting their synchronization timing in response to the shifted synchronization signals and repeating the steps of transmitting and adjusting until unified synchronization is achieved among the plurality of networks.

There is also provided in accordance with the present invention a node connected to a media comprising a media coupling circuit adapted to electrically interface the node to the media, an application processor for executing an application program, a media access controller comprising a synchronization signal generator adapted to randomly generate a synchronization signal and subsequently transmit the synchronization signal onto the media during a predetermined synchronization time slot, a synchronization mechanism adapted to achieve synchronization between a particular node and other nodes, the synchronization mechanism operative to control the generation of the synchronization signal by the synchronization signal generator, a timing mechanism operative to produce a timing signal derived from a plurality of received synchronization signals, frame occupation signal generator adapted to generate a frame occupation signal when the node obtains access to the media and a media access controller for coordinating access to the media, wherein access to the media is not permitted as long as the presence of a frame occupation signal is detected on the media, a transmit circuit adapted to receive a data stream from the media access controller for transmission onto the media and a receive circuit adapted to output a data stream received over the media to the media access controller.

There is still further provided in accordance with the present invention, in a network including a plurality of nodes, a method of media access control for achieving coexistence of disparate nodes, the method comprising the steps of allocating a synchronization time slot dedicated to the transmission of synchronization signals, allocating a frame occupation time slot dedicated to the transmission of frame occupation signals, each node inserting a synchronization signal on a random basis during the synchronization time slot, each node deriving timing from synchronization signals received from other nodes when that node is not transmitting the synchronization signal, each node listening for the presence of frame occupation signals to determine whether the media is available and once a node detects the media is available, securing the media by transmitting the frame occupation signal during the frame occupation time slot.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1A:
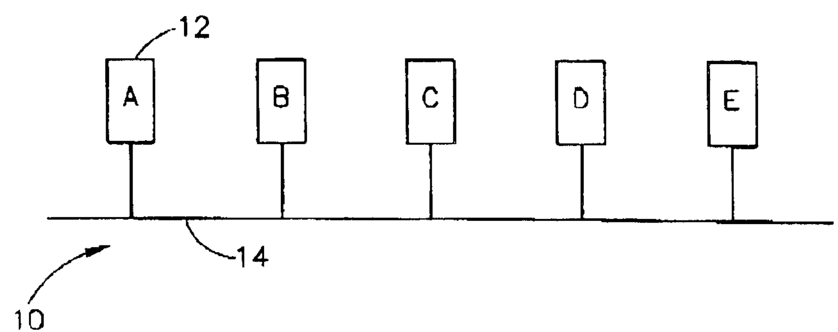
FIGS. 1A to 1D are diagrams illustrating several prior art examples of shared networks.
Figure 1B:
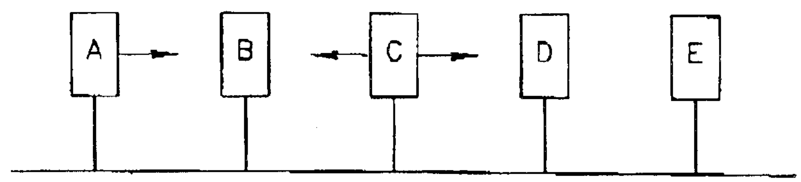
Figure 1C:
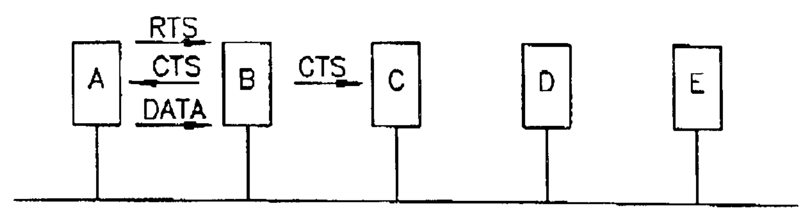
Figure 1D:
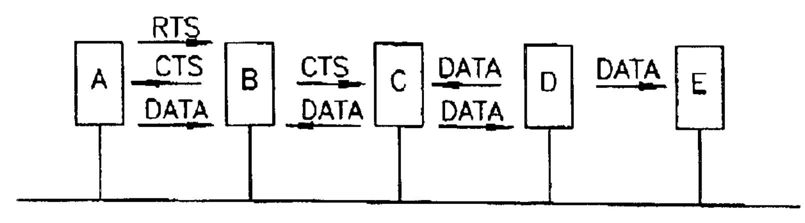

The following notation is used throughout this document.

| Term | Definition |
|---|---|
| AC | Alternating Current |
| ASIC | Application Specific Integrated Circuit |
| CSMA | Carrier Sense Multiple Access |
| CTS | Clear to Send |
| EEROM | Electrically Erasable Read Only Memory |
| IEEE | Institute of Electrical and Electronic Engineers |
| ISI | Intersymbol Interference |
| LAN | Local Area Network |

-continued

| Term | Definition |
|---|---|
| MAC | Media Access Control |
| PLL | Phase Locked Loop |
| RAM | Random Access Memory |
| RF | Radio Frequency |
| ROM | Read Only Memory |
| RTS | Request to Send |

The present invention is a media access control (MAC) mechanism that enables nodes from different networks having different technologies and protocols to coexistence using the same shared media. The present invention is suitable for use with a wide range of different types of network and technologies and is particularly useful in providing coexistence capabilities to powerline based data communication systems and wireless LAN systems. Wireless and powerline media are typically characterized by a large variety of propagation paths and conditions resulting in the increased likelihood of hidden node and mask node problems.

The media access control mechanism of the present invention provides a solution to the communication problems imposed by the characteristics of the powerline media, e.g., the hidden node and mask node problems described previously. In addition, the MAC mechanism enables the efficient coexistence of nodes that employ different communication technologies.

The media access control mechanism comprises assigning specific time slots for the transmission of a busy signal (or frame occupation signal) which functions to indicate to all nodes that hear it that the media channel is occupied. The frame occupation signaling is transmitted periodically at the same time during each frame. A node refrains from initiating a new transmission if it detects the frame occupation signal. A node begins transmission only after it ceases to detect a frame occupation signal.

In order to provide common timing for the frame occupation signal, a distributed synchronization mechanism is implemented. In accordance with the mechanism, each node is adapted to transmit on a random basis, a synchronization signal during a preassigned time slot during the frame. During times that a node does not transmit the synchronization signal, it listens to the media. A timing reference signal is derived from the synchronization signals received from other nodes during these listening periods. The node then adjusts its internal clock in accordance with the derived timing reference signal.

For purposes of this specification, the term ‘network device’ shall be taken to mean any physical device included within a network, including but not limited to, a switch, router, hub, exchange, bridge, workstation, terminal or any device embedded or not that is capable of communicating over a network. The term ‘node’ shall be taken to mean any network entity, implemented in either hardware or software, embedded or not, which may be the endpoint of a link or call within a network. The term ‘link’ or ‘call’ shall be taken to mean any communication path that is established between at least two nodes for the purpose of communication therebetween.

Figure 2:
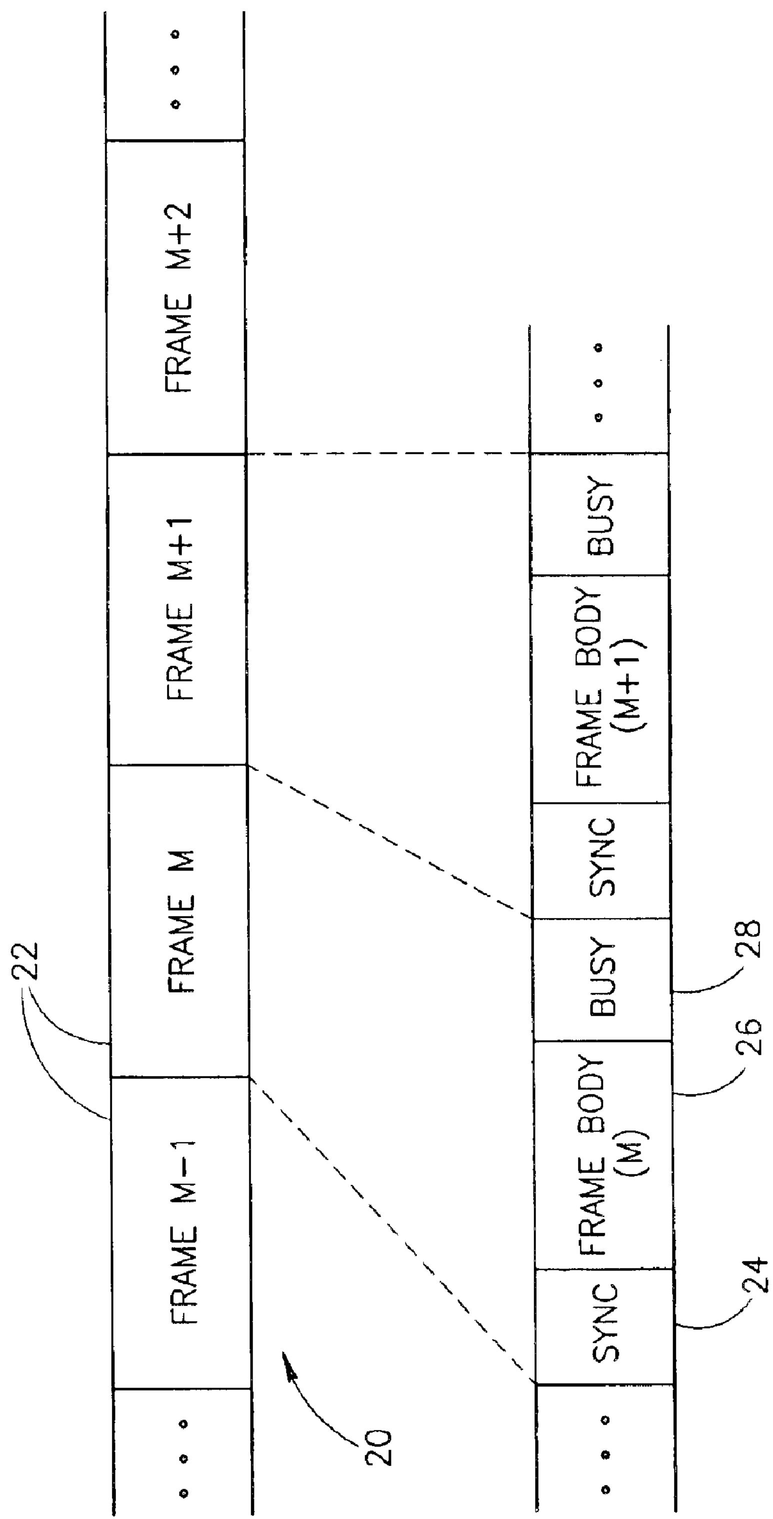
FIG. 2 is a diagram illustrating the synchronization and frame occupation signals inserted into the frame stream in accordance with the present invention.

A diagram illustrating an example embodiment of the synchronization and frame occupation signals inserted into the frame stream in accordance with the present invention is shown in FIG. 2. The invention is based on and described in the context of a common frame structure, generally referenced 20. In accordance with the present invention, time is divided into fixed length frames 22. Note that the term ‘frames’ or Protocol Data Unit (PDU) as used herein means a fixed period of time and is not meant to refer to the term ‘frames’ as commonly used by the 802.3 Ethernet LAN standard. It is also not intended that the term ‘frames’ as used herein refer to the common use of the term ‘packet.’

The term ‘frame’ is used herein in the generic sense and is intended to refer to the lowest unit of time in which the media can be occupied.

All nodes attached to the media are synchronized to each other using the synchronization method of the present invention presented hereinbelow. Thus, the frame timing for all nodes is identical at all frames. The accuracy of the frame timing, however, is limited by the accuracy of the synchronization method.

Each frame 22 comprises two pre-defined time slot locations: one for a synchronization signal 24 and the other for a ‘media busy’ or ‘frame occupation’ signal 28. The frame body 26 is the original data portion of the frame that would be transmitted without using the present invention.

Note that it is not required that the lengths of the frames be equal. The frame lengths should, however, be regular, meaning that each node can determine their lengths. Practically, however, it is easier to implement the invention using frames of equal length. In addition, the placement of the frame occupation signal time slot is not critical. It preferably, however, precedes the body of the frame. A single frame occupation signal may be sent in each frame. It is important that its position within a frame be fixed and known to all nodes on the network.

Note that it is not necessary to have one synchronization pulse per frame. Any suitable regular pattern can be used. The scheme described herein, however, is only an example intended to aid in illustrating the principles of the present invention.

The synchronization signal comprises any suitable pulse that has the collision resistance characteristics described below. It is transmitted simultaneously by all nodes, as explained below. The media occupation signal is also a short pulse, which has the same collision resistance characteristics. It is transmitted simultaneously by one or more nodes. When the signal is transmitted, it indicates to all nodes that hear it that the next frame is occupied.

Note that a frame, as seen by any given node, is either occupied or free. An occupied frame is indicated by the presence of a frame occupation signal (or media busy signal) that is transmitted by one or more nodes during the previous frame. An available frame is indicated by the absence of a frame occupation signal being transmitted during the previous frame.

When a frame is occupied, the nodes that have participated in occupying the frame can transmit freely during the frame. No other node is allowed to transmit during an occupied frame. When a frame is free, any node is allowed to transmit in it, according to the media capture method described below. Preferably, but not necessarily, the duration of the frame should be set sufficiently long such that a pair of nodes, constructed using any desired technology, is able to exchange at least a pair of messages within a single frame.

An illustrative example of the coexistence provided by the media access control method of the present invention is presented. Let nodes A and B in the examples described above in connection in FIGS. 1A to 1D be constructed using one type of technology and let nodes C and D be constructed using a different type of technology. Nodes A and B then communicate with each other, while nodes C and D also communicate with each other while the media is shared such that the two links do not disturb each other.

Figure 3:
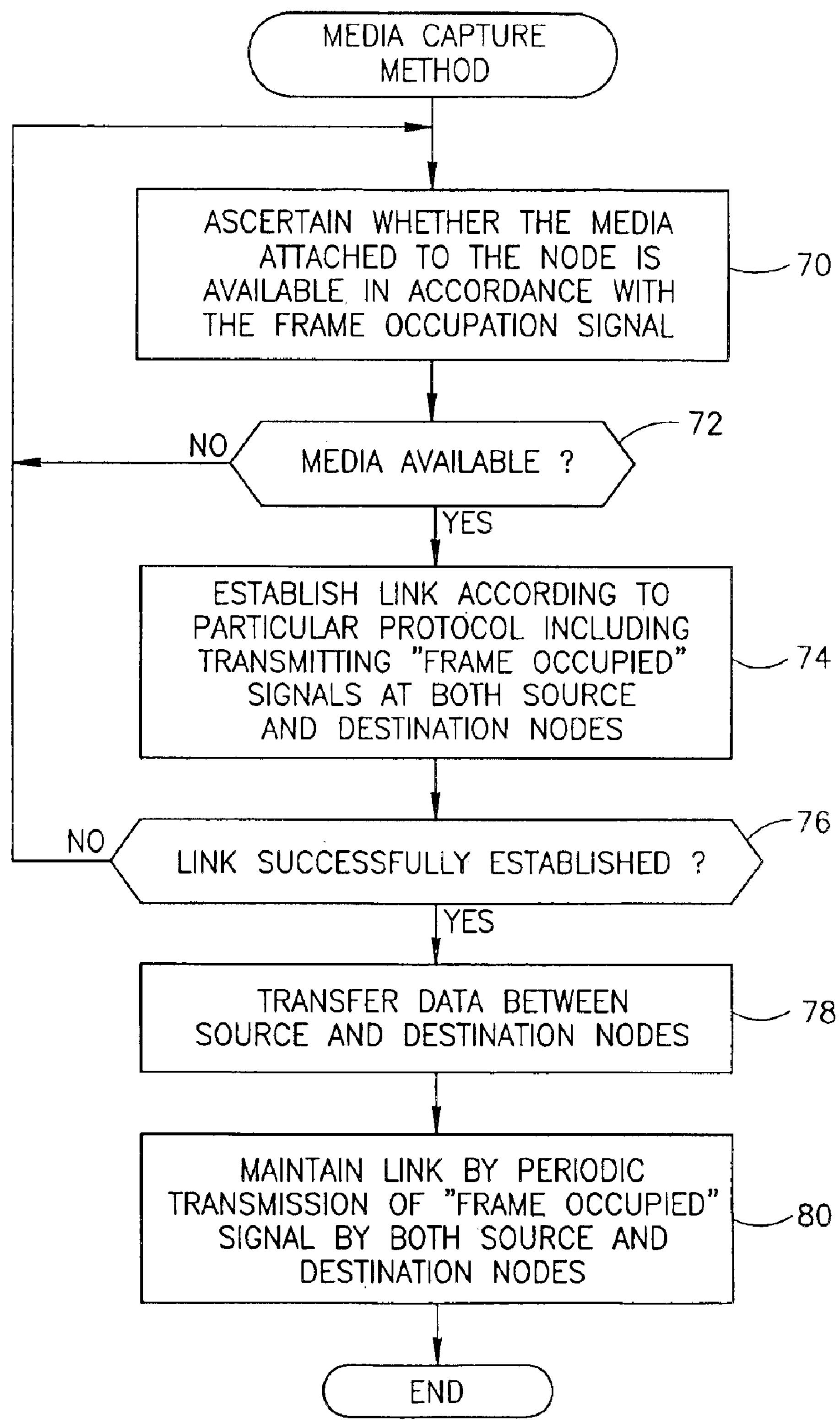
FIG. 3 is a flow diagram illustrating the media capture method of the present invention.

In accordance with the present invention, the frame structure and the signaling and media busy framework associated with it can be utilized to implement an efficient media capture mechanism, which will now be described. A flow diagram illustrating the media capture method of the present invention is shown in FIG. 3. The first step to be performed for a node that wishes to transmit is to determine whether the media the node is attached to is available (step 70). This is determined by listening for the presence of frame occupied signals. If none are detected (step 72), the media is deemed to be available. Note that a new transmission can only begin when the media is available.

Alternatively, the node is adapted to wait a random number of free frames before starting to transmit. The method technique of waiting a random time is a well known technique to reduce the probability of collision and is referred to as 'back off' and as 'collision avoidance' as described in the IEEE 802.11 standard. In accordance with the invention, the back off technique is incorporated into the method performed by the nodes of the network.

A link is then established by first capturing the media by transmitting frame occupied signals at both ends of the link, i.e. source and destination nodes or transmitting and receiving nodes (step 74). The link is also established in accordance with the particular protocol and technology in use by both ends of the link exchanging technology and protocol dependent coordination messages to each other.

The typical order of operation is as follows: exchange of messages followed by occupation of the next frame. Optionally, the next frame may be occupied 'in advance' before the nodes know that the message exchange was successful. In this case, if the exchange of messages fails, the nodes will not occupy the frame after the first occupied frame. The source node has two options: (1) it can decide to send a busy signal once it has decided to send an RTS message, or (2) it can wait for the CTS message. The destination node sends a busy signal only after it has received the CTS message. Note that the terms 'source' and 'destination' are intended to mean 'initiator' and 'responder', respectively. When the link is established, data can be transferred from node A to node B or from node B to node A.

Once the link is successfully established (step 76), data frames can be transferred over the link between the source and destination nodes (step 78). The link is maintained by the periodic transmission of a frame occupation signal by both end nodes regardless of which node is transmitting or receiving (step 80).

Figure 4:
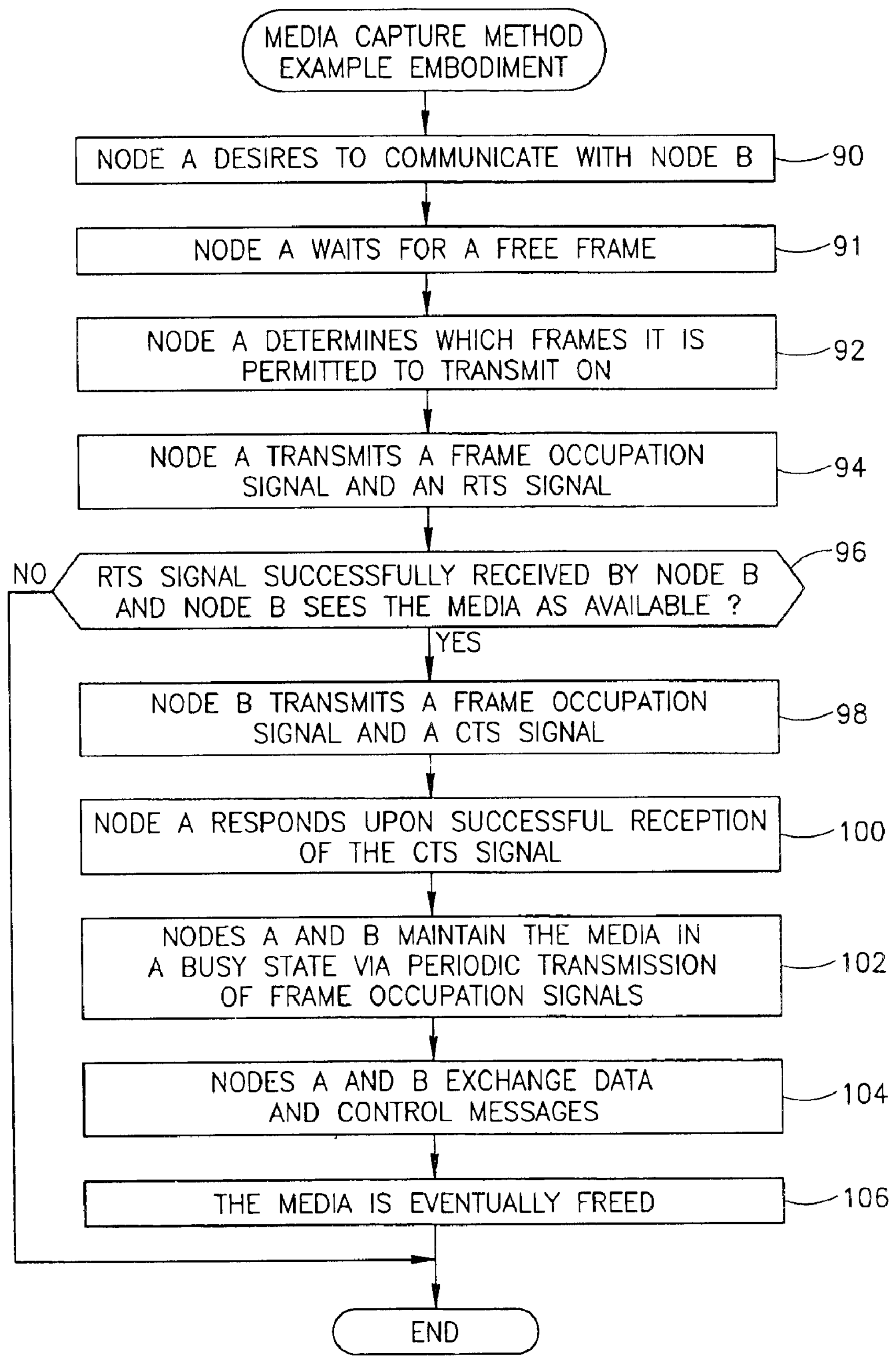
FIG. 4 is a flow diagram illustrating an example embodiment of the media capture method of the present invention.

An example embodiment of the media capture method of the present invention will now be described. A flow diagram illustrating an example embodiment of the media capture method of the present invention is shown in FIG. 4. First, it is assumed that node A wishes to initiate a data communication session with node B (step 90). Node A then waits for a free frame (step 91). Node A then determines, in accordance with a predetermined mechanism, in which of the upcoming free frames it is entitled to transmit (step 92). When the time for node A to transmit arrives, node A transmits in frame n a frame occupation signal and a technology dependent message to node B, e.g., a Request To Send (RTS) message (step 94). Note that a frame occupation signal transmitted during frame n refers to frame n+1.

Node A then waits for a rely (within the same frame in this example). For example, the reply may comprise a Clear To Send (CTS) message. If the RTS message was successfully received by node B and node B determines that the channel is free (step 96), then node B transmits during frame n a frame occupation signal and a technology dependent reply to node A, e.g., a CTS message (step 98). If the CTS message was successfully received by node A, node A then transmits during frame n+1 any technology dependent messages to node B (step 100).

From that point on, nodes A and B maintain the media in the occupied state by periodically transmitting frame occupation signals (step 102). Note that both nodes A and B transmit the frame occupation signals. As long as the media is occupied, nodes A and B can exchange data and control (e.g., ACK) messages (step 104). Eventually, nodes A and B free the media at the occurrence of one of the following events: (1) a defined time limit is exceeded; (2) both nodes A and B have no more data to exchange; or (3) nodes A and B are unable to continue communicating with each other (e.g., bad propagation conditions, excessive noise, etc.) (step 106). Note that, preferably, both sides of the link transmit the busy signal, but this it not a requirement.

The synchronization method of the present invention will now be described in more detail. As described previously, the media across control mechanism of the present invention is applicable to networks using different technologies to coexist on the same shared media. The mechanism of capturing the media relies on the simultaneously placement of frame occupation signals at certain points in time by multiple nodes. The synchronization method described herein provides the necessary synchronization to the nodes attached to the media to enable the media capture method described hereinabove. Note that this mechanism is useful for the synchronization of any group of distributed nodes, especially when the nodes are implemented using different technologies.

As described above, a synchronization time slot is assigned to each frame. Each node transmits a synchronization signal in a predefined manner. Note that one skilled in the network arts can construct numerous methods of transmitting the synchronization signal. An example method is presented hereinbelow.

Preferably, the control signals (or pulses), including the synchronization signal, the frame occupied signal, etc. comprise wide band signals with collision resistant signal characteristics. This means that if several nodes transmit the same signal at the same time, the simultaneous transmissions will not be canceled by each other and that any node that can hear at least one of the transmitting nodes will be able to detect the transmitted signal. Note that it is not necessary to be able to determine the source of any of the synchronization signals received by a node. It is important to note that the synchronization signal used be collision resistant. Using a wide band signal is one way to achieve this.

Several types of wide band signals have the above described signal characteristics. Three examples include: (1) a sequence of several consecutive short single tone pulses, each pulse having a different frequency; (2) a wide-band bi-phase sequence with relatively good autocorrelation properties; and (3) several coherent single tone signals transmitted simultaneously.

Figure 5:
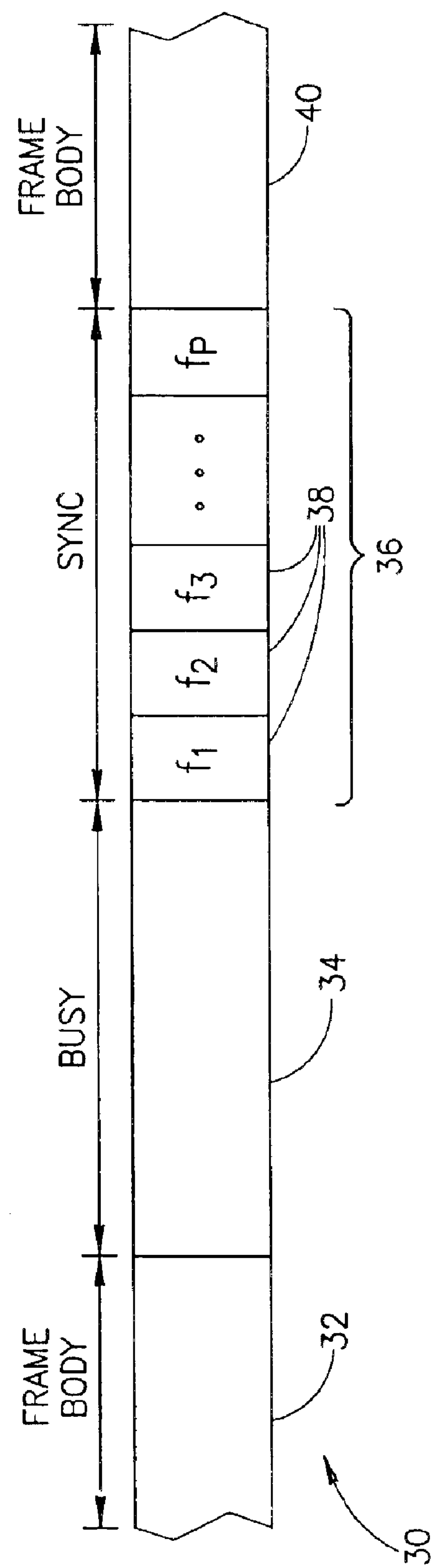
FIG. 5 is a diagram illustrating the frame sequence when the synchronization signal comprises a plurality of tone signals each having a different frequency.

A diagram illustrating the frame sequence when the synchronization signal comprises a plurality of tone signals each having a different frequency is shown in FIG. 5. The sample frame stream, generally referenced 30, comprises a frame body 32, frame occupied signal 34 and synchronization signal 36 followed by a second frame body 40. The synchronization portion 36 is divided into sub slots of single tone pulses 38 labeled, $f_1,f_2, f_3 \ldots f_P$. Each node is adapted to transmitted all frequency tones in the synchronization time slot in the same order.

All synchronization pulses transmitted by the nodes are identical and transmitted at the same time, with a timing accuracy limited to the synchronization process. Due to the spreading and ISI caused by a non ideal channel, however, they are received at any given node spread out over time in accordance with the following expression.

$$y(t) = \sum_i x(t - \tau_i) \quad (1)$$

$$x(t) = s(i) * h_i(t) \quad (2)$$

where

- * represents convolution;
- y(t)=the received signal at a given node;
- $x_i(t)$=the received signal assuming that node i was the only node to transmit;
- s(t)=an individual pulse transmitted by a node;
- $h_i(t)$=the channel response between node i transmitter and the given node's receiver;
- $\tau_1$=time difference between pulses due to synchronization inaccuracies.

Note that each node receives an average of the plurality of distorted synchronization signals sent by other nodes. Better performance is achieved if the synchronization signal has good auto-correlation properties (i.e. the autocorrelation curves comprises a large central peak). Each node is operative to determine the center of the received signal (i.e. the average synchronization signal) and derive its timing therefrom. The timing signal derived is then used to adjust the internal clock in each node.

Figure 6:
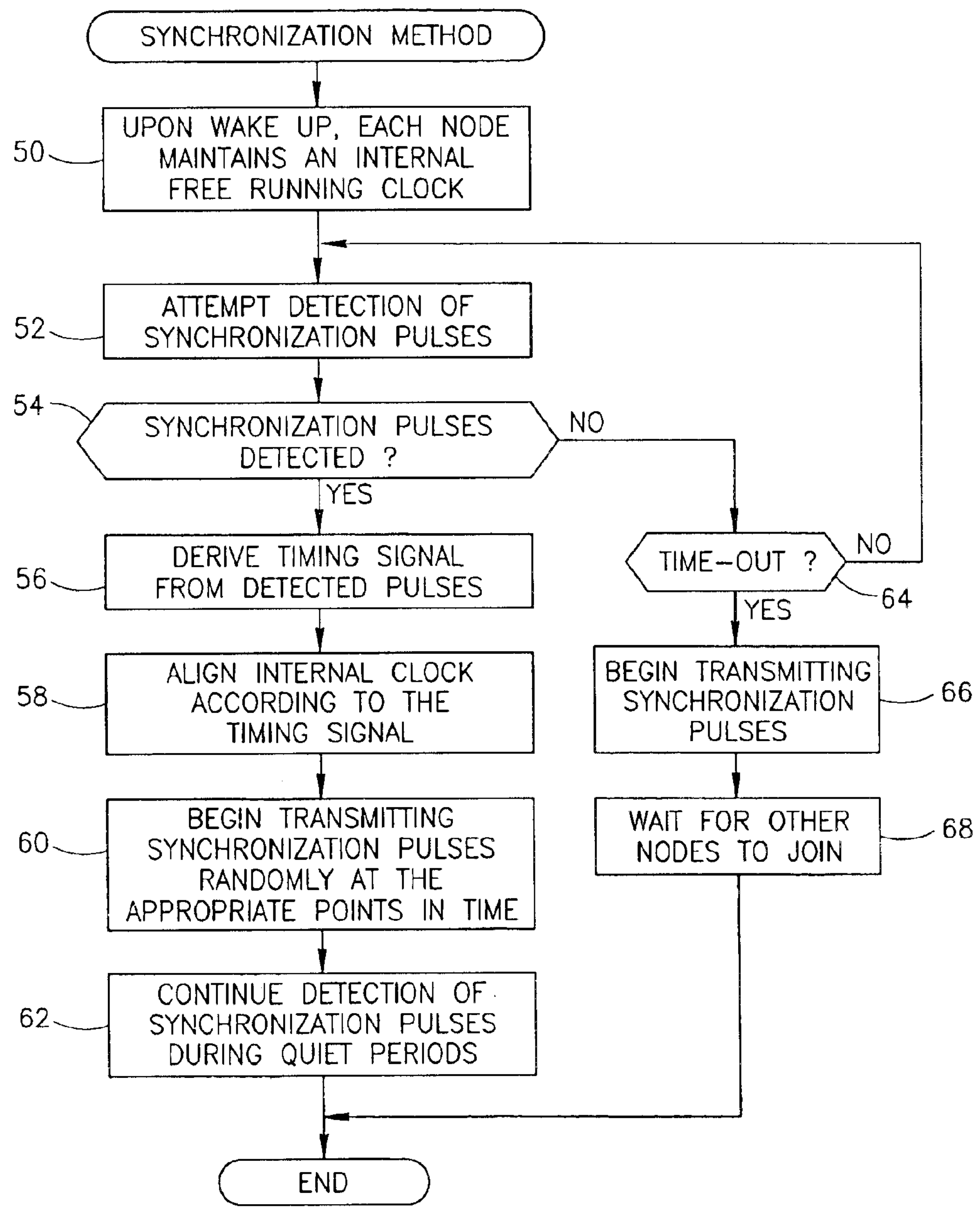
FIG. 6 is a flow diagram illustrating the synchronization method of the present invention.

A flow diagram illustrating the synchronization method of the present invention is shown in FIG. 6. Each node is adapted to maintain its own internal free running clock. Upon wake-up, each node maintains its free running clock which is used to derive frame timing (step 50). After wake-up, a node is operative to listen to the media for a predetermined length of time and attempt to detect synchronization signals transmitted by other nodes (step 52).

If synchronization pulses are detected (step 54), the node derives a timing signal from the pulses (step 56) and aligns its internal clock in accordance with the timing signal, for example via a Phase Lock Loop (PLL) (step 58). After the node has aligned its internal clock with the received synchronization pulses, the node starts transmitting synchronization pulses randomly at the appropriate locations in time (step 60). The synchronization pulses are transmitted randomly, meaning that the decision whether to transmit a synchronization pulse is that particular frame is determined randomly. A random number generator within the node is used to generate a random number between zero and one. A threshold number is chosen wherein if the random number generated is less than the threshold, the synchronization pulse is transmitted. If the random number generated is equal to or greater than the threshold, than the synchronization pulse is not transmitted. Thus, the threshold chosen corresponds to a duty cycle for transmission of the synchronization signal. To illustrate consider a threshold set to 0.25. This corresponds to a duty cycle of 25% meaning the synchronization signal will be transmitted in 25% of the frames. Note that the duty cycle chosen may chosen depending on the particularly application.

When the synchronization pulse is not transmitted, the node instead listens to the media and detects the synchronization pulses transmitted by other nodes. The detected pulses are used to derive the timing reference signal which is used to maintain the internal clock of the node being synchronized with the other nodes (step 62).

If, after wake-up, a given node does not detect any synchronization signals during the predetermined time (step 64), it starts transmitting synchronization pulses (step 66). These synchronization pulses are transmitted randomly in the same manner described above. The node then waits for other nodes to join the network (step 68).

Note that alternatively, all nodes or a portion thereof may have access to an external clock. In this case, the nodes derive timing from the external clock. For example, if the media comprises the powerline, the zero crossings of the 50 or 60 Hz AC sine wave can be detected and used to derive the frame timing. In three phase systems, the issue of multiple phases can be solved by using a multiple of the AC frequency, i.e. 150 or 180 Hz or multiples thereof.

Note, however, that the external clock might be not accurate enough or not always detectable. Therefore, the method provides for the use of the external clock as a starting point of the synchronization process. The advantage is that the convergence is quicker in event of a merging of networks. As described in more detail hereinbelow.

Derivation of Timing

As described above, all nodes transmit the synchronization pulses at the same time in random fashion, with an accuracy equal to that of the synchronization process. Therefore, the accumulated signal received at a given node has the shape of a synchronization pulse, with some degree of delay spread due to channel ISI, propagation delay, inaccuracies, etc. The timing derived from the received signal is therefore an average of the timing of the individual synchronization signals of the individual nodes.

One method for deriving an average timing signal from the individual synchronization signals is to 'time average' the signal output from a matched filter which is matched to the synchronization pulse. For example, let

- t=time;
- p(t)=output of the matched filter at time t;
- T=the frame duration (i.e. pulse repetition interval);
- t'=t mod T;

Then, the timing signal $\tau$ is given by the expression below $$\tau = \frac{\int t' p(t) dt}{\int p(t) dt} \quad (3)$$

It is appreciated by those skilled in the art that other methods for determining the timing signal may be used without departing from the scope of the present invention.

Synchronization Convergence Method

Figure 7:
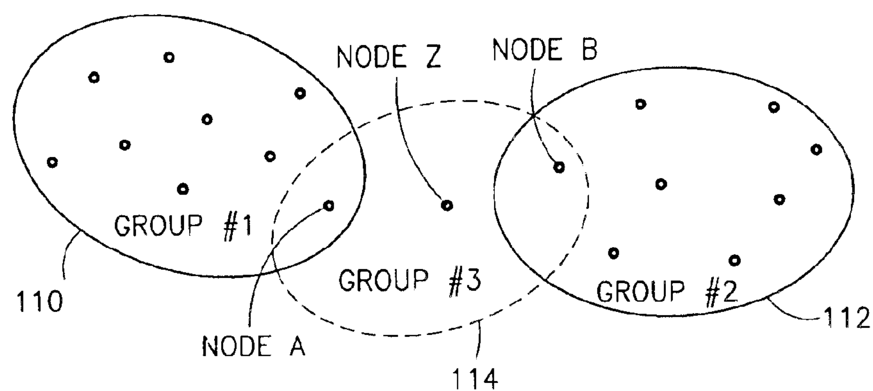
FIG. 7 is a diagram illustrating a node positioned to hear two disparate networks that cannot hear each other.

In some cases, a situation may arise whereby two or more groups of nodes share the same media but are located such that they cannot hear each other due to media attenuation. Thus, they operate independently from each other. As a consequence, the synchronization timing of the groups are likely to be out of synchronization with each other, since each operates asynchronously with respect to the others. Consider a node that is established in a position such that it can hear members of more than one group. This situation is illustrated in FIG. 7 for the case of two disparate groups.

Group #1 110 comprises a plurality of nodes while group #2 112 also comprises a plurality of nodes. Groups #1 and #2 cannot hear one another. Node Z wakes-up or is installed and turned on and is situated such that it can only hear Node A in group #1 and node B in group #2 thus defining a third group #3 114.

Figure 8:
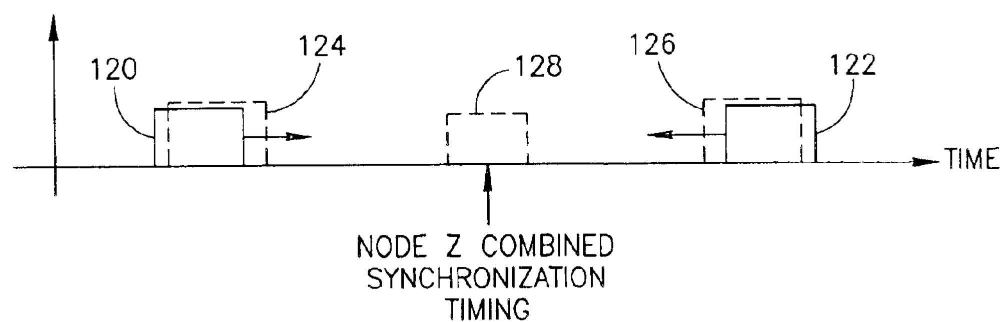
FIG. 8 is a diagram illustrating the synchronization signals generated by the networks and the shifted synchronization signal generated by node Z.

Since the synchronization of groups #1 and #2 are asynchronous with each other, node A will hear more than one synchronization signal. In accordance with the method of the present invention, node Z is operative to determine a combined average or converted synchronization timing that takes into account all the synchronization signals it receives. It then generates a synchronization signal skewed (or shifted) toward the converted timing that encompasses all the disparate groups it hears. A shifted synchronization signal is then output and heard by all the groups as shown in FIG. 8. Gradually over time the synchronization timing of all the groups converge to have the same timing.

If the two synchronization signals are far away from each other and if node Z transmits in the middle, its signal will not be detected because of other transmissions. Only synchronization signals within the open slot for synchronization signals are heard. Therefore, node Z transmits two synchronization signals, each one corresponding to the respective detected signal. The pulses are slightly shifted in time so as to push the too groups together.

Referring to the example above, synchronization pulse 120 represents the pulse generated by group #1 and heard by node Z. Pulse 122 represents the pulse generated by group #2 and heard by node Z. Pulse 124 represents pulse 120 shifted towards the desired timing pulse 128 that combines the timing from groups #1 and #2. Likewise, pulse 126 represents pulse 122 shifted towards the desired timing pulse 128.

Figure 9:
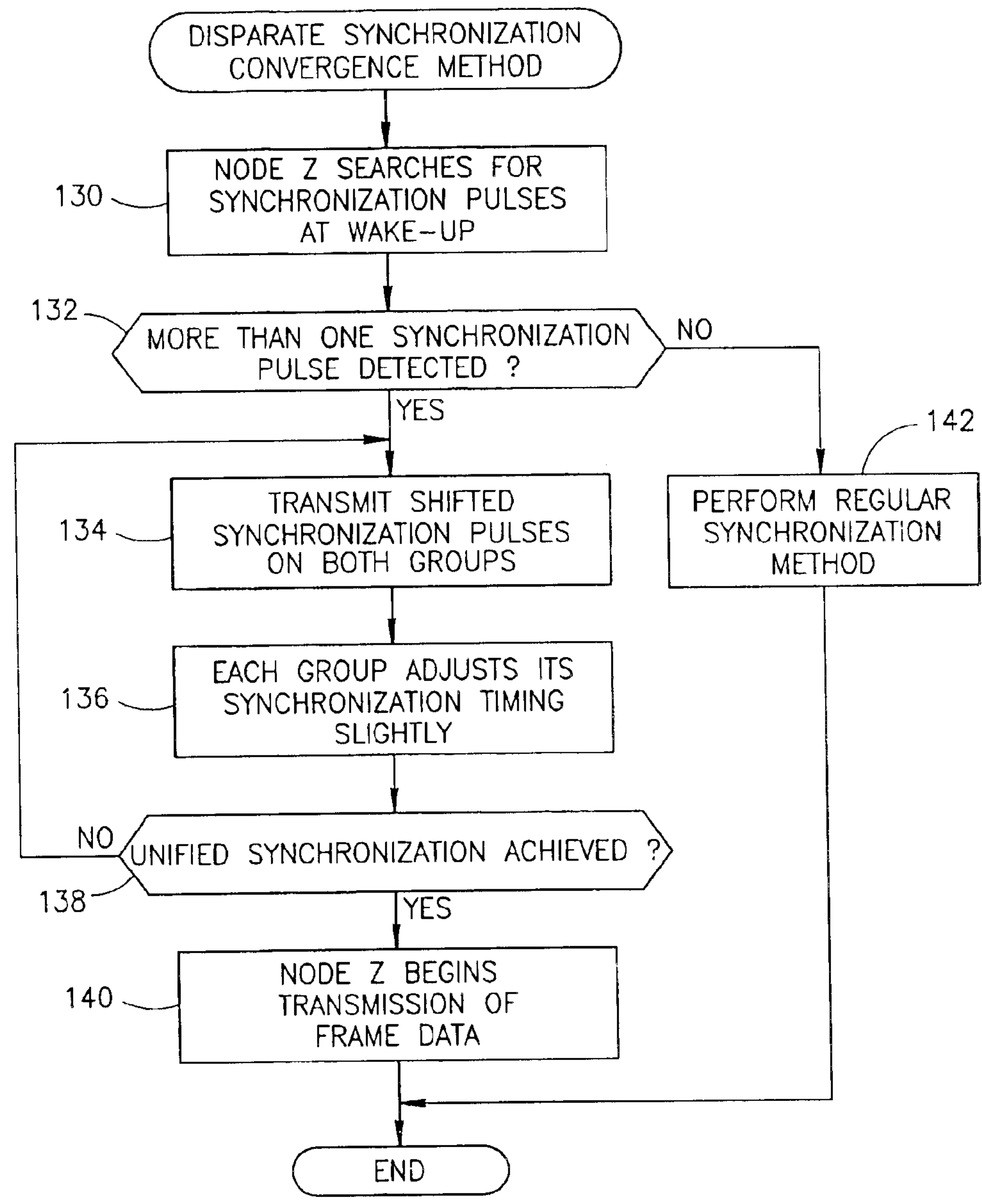
FIG. 9 is a flow diagram illustrating the disparate synchronization convergence method of the present invention.

A flow diagram illustrating the disparate synchronization convergence method of the present invention is shown in FIG. 9. At wake-up, node Z searches for synchronization pulses by listening to the media (step 130). If more than one synchronization pulse is detected (step 132) then shifted synchronization pulses are generated and transmitted, one for each distinct group head (step 134). In the example presented herein, two synchronization pulses will be generated and transmitted per frame. Note that all the pulses will be heard by all the groups. The nodes, however, can be adapted such that the remaining synchronization pulses have minimal impact on the operation and performance of each node. Each group will react to the pulse closed to its own synchronization timing and in response thereto, will adjust its timing accordingly, since the average synchronization timing will have changed (step 136).

The common node (e.g., node Z) is operative to continue this process by generating synchronization pulses further shifted toward the convergence point unit unified synchronization is achieved (step 138). At this time, the synchronization timing of all the groups will have been adjusted and made uniform in accordance with the timing determined by node Z. Node Z can then begin transmission of data and control information (step 140).

Note that the above synchronization convergence method may taken from several seconds to several minutes depending on the frame rate, the number of disparate groups being joined and the degree of disparity between the groups.

Node Device Incorporating the Media Access Controller

Figure 10:
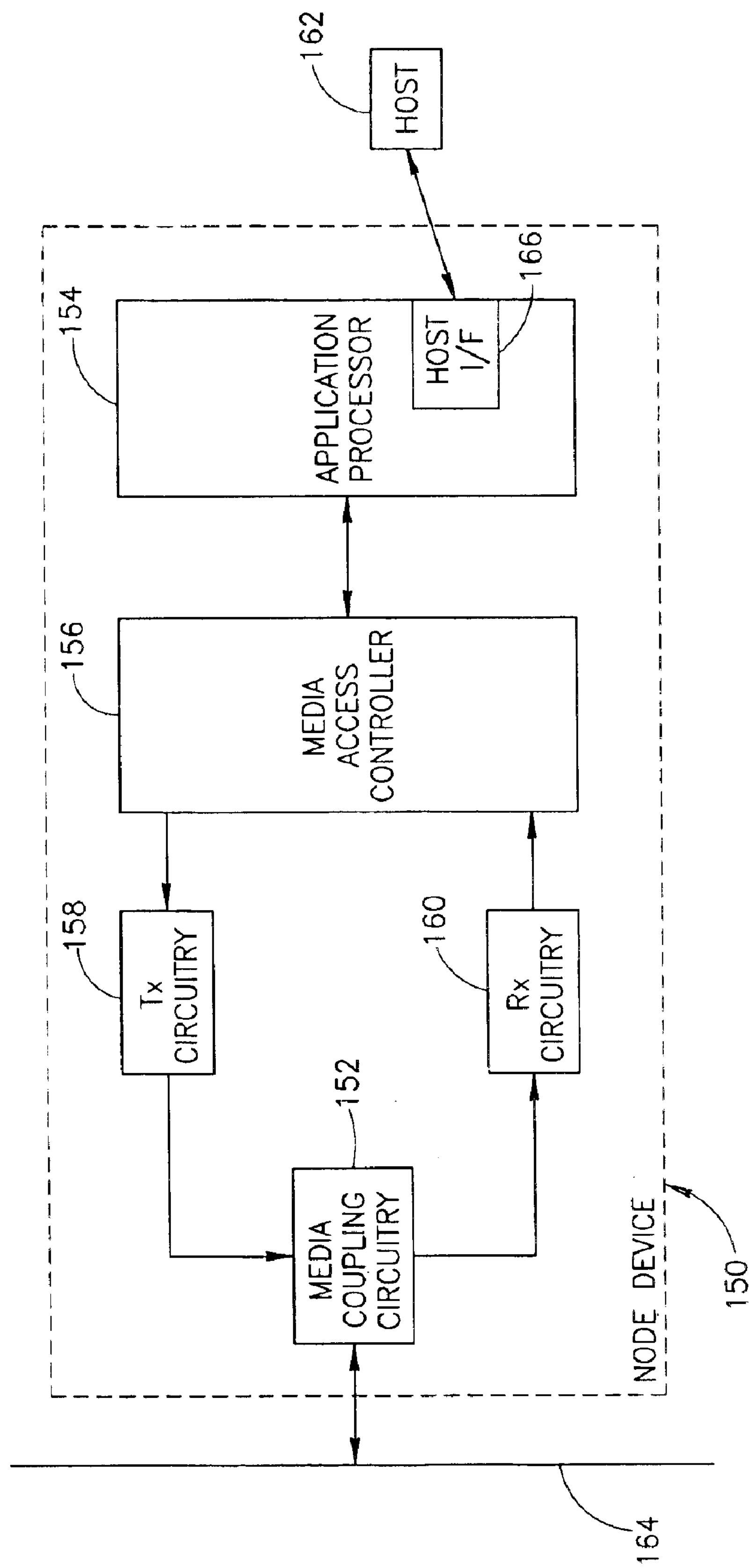
FIG. 10 is a block diagram illustrating a node device incorporating a media access controller constructed in accordance with the present invention.

An example embodiment of a node device incorporating the media access controller of the present invention will now be described. A block diagram illustrating a node device incorporating a media access controller constructed in accordance with the present invention is shown in FIG. 10. The node device, generally referenced 150, represents a node device that may operative stand alone or may be incorporated within a network device such as a switch or router for performing communication functions (i.e. implementing OSI stack protocol functions including MAC functionality). The node device comprises an application processor 154 with associated static memory and dynamic memory (not shown) all in communication with the processor. The application processor is also in communication, via a host interface 166, with a host device. The host may be adapted to communicate over one or more other networks.

The node device also comprises media coupling circuitry 152 that functions to interface the node device to the shared media 164. Transmit circuitry 158 and receive circuitry 160 communicate over the media via the media coupling circuitry. The media access controller (MAC) 156 functions, on one side, to provide transmit data to the transmit circuit and to receive data from the receive circuit. On the other side, it interfaces to the application processor. The MAC 156 functions to perform layer 2 (i.e. link layer) functions including controlling access to the media using the access and synchronization methods described above.

Note that the media access control methods may be implemented in software and adapted to reside on a computer readable medium, such as a magnetic disk, floppy disk, Flash memory card, EEROM based memory, bubble memory storage, RAM storage, ROM storage, etc. The software may also reside, in whole or in part, in the static or dynamic main memories or in firmware within the processor of a computer system (i.e., within microcontroller, microcomputer internal memory). The host or other network interface device is capable of transmitting and receiving a carrier wave signal which encodes the media access control software. In particular, the media access control software comprises a sequence of instructions which, when executed by the processor, cause the computer system to perform the steps of any of the methods described hereinabove.

In alternative embodiments, the present invention may be applicable to implementation of the methods and apparatus described above in integrated circuits, especially Application Specific Integrated Circuits (ASICs) or chip sets, wireless modem implementations, powerline modem implementations, switching system products and transmission system products. Note that a combination of software and hardware can also be implemented, the former performing the complex operations and the latter performing the time critical operations.

Figure 11:
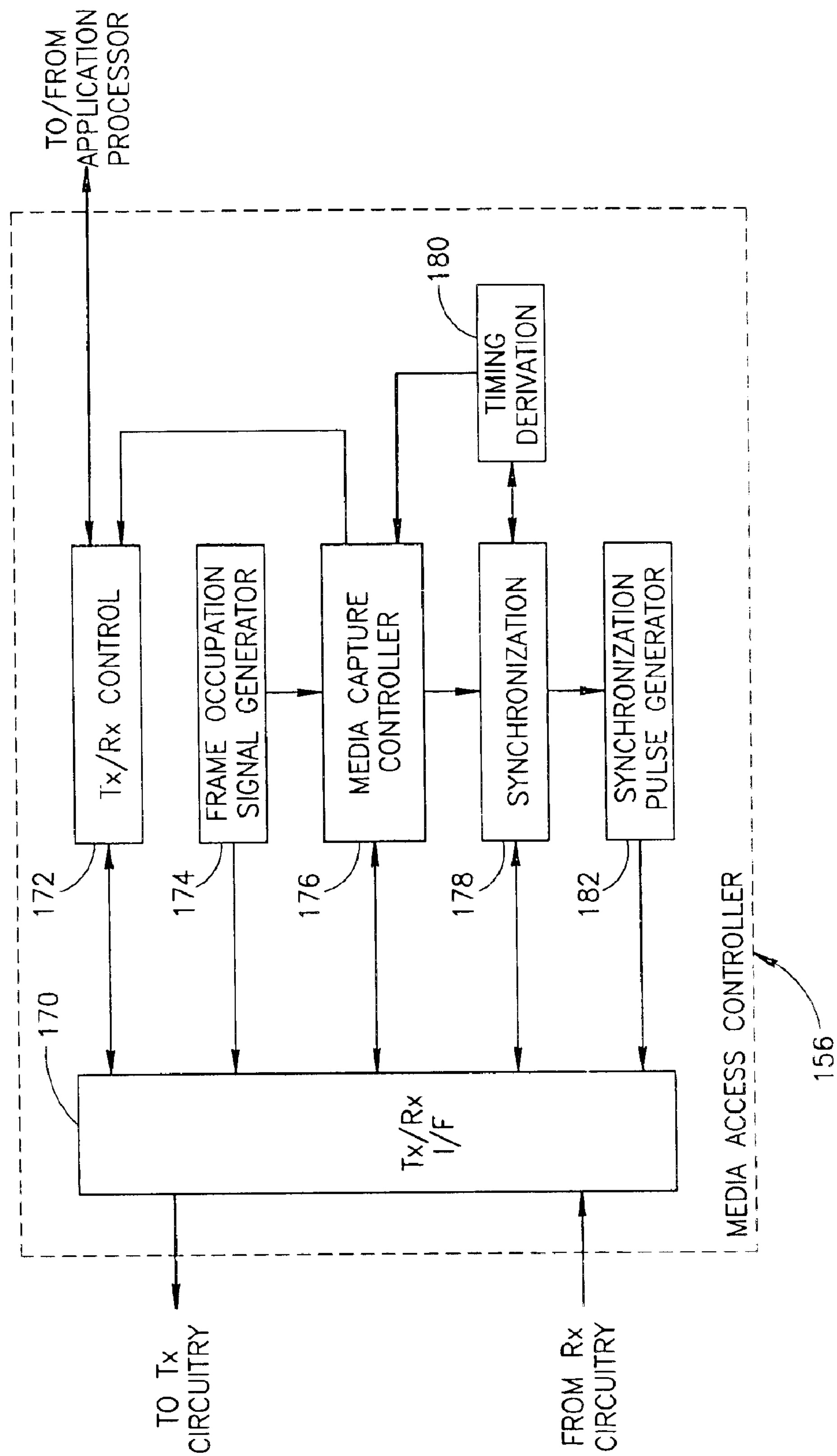
FIG. 11 is a block diagram illustrating the media access controller of the present invention in more detail.

A block diagram illustrating the media access controller of the present invention in more detail is shown in FIG. 11. The media access controller 156 comprises a transmit/receive interface 170 which functions to interface the MAC to the transmit and receive circuits. The transmit/receive control 172 functions to coordinate the transmission of data from the application processor to the media via the Tx/Rx interface and transmit circuit and to coordinate the reception of data from the receive circuit via the Tx/Rx interface to the application processor.

The media capture controller 176 functions as the central coordinator among the various functional blocks in the MAC including the Tx/Rx control 172. It is adapted to perform the media capture methods described hereinabove. The frame occupation signal generator 174, under control from the media capture controller 176, functions to generate the frame occupation signal at the appropriate time in the frame cycle.

The synchronization module 178, under the control of the media capture controller 176, functions to determine the timing signal used by the media capture controller to properly time the generation of frame occupation signals when the node is transmitting. The synchronization pulse generator 182 functions to generate a synchronization pulse in accordance with the synchronization method described above. The timing derivation module 180 functions to extract the timing signal from the synchronization pulses that are received during synchronization time slots where the node does not transmit the synchronization pulse.

Note that the media access methods are suitable to be implemented in hardware such as on an ASIC or other logic device, processor, etc. It is appreciated that one skilled in circuit design arts can adapt the methods of the present invention for implementation in an ASIC. In this case, the resulting hardware logic is adapted to perform the methods described hereinabove.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of distributed decentralized synchronization between a plurality of nodes connected to a media, each node including a clock, said method comprising the steps of:

listening to the media for a predetermined length of time while attempting to detect synchronization signals from other nodes;

if synchronization signals are detected, deriving a timing signal from said synchronization signals;

aligning the clock in a particular node in accordance with said timing signal;

randomly transmitting, on a frame by frame basis, synchronization signals onto said media within a synchronization time slot;

maintaining synchronization with other nodes by listening to said media for synchronization signals transmitted by other nodes when said synchronization signal is not transmitted during said specific points in time and detecting synchronization signals transmitted by other nodes;

if synchronization signals are not detected, randomly transmitting, on a frame by frame basis, synchronization signals onto said media within said synchronization time slot and waiting for other nodes to join said network; and maintaining said media in an occupied state once synchronization is achieved by periodically transmitting a frame occupation signal within a media busy time slot indicating to all other nodes that the next frame is occupied.

2. The method according to claim 1, wherein said step of listening is performed at least upon wake-up of a node.

3. The method according to claim 1, wherein said synchronization signal comprises a sequence of single tone pulses, each pulse having a different frequency.

4. The method according to claim 1, wherein said synchronization signal comprises a wide band bi-phase sequence.

5. The method according to claim 4, wherein the each node is adapted to transmit a different bi-phase sequence.

6. The method according to claim 4, wherein said wide band bi-phase sequence is adapted to have good autocorrelation properties.

7. The method according to claim 1, wherein said step of aligning comprises providing a phase lock loop adapted to receive said timing signal and operative to maintain said clock in synchronization with said timing signal.

8. The method according to claim 1, wherein said step of transmitting comprises the step of selecting a number at random and transmitting said synchronization signal if the number selected is less than a predetermined threshold number chosen, wherein said predetermined threshold number corresponds to a desired duty cycle.

9. The method according to claim 8, wherein said duty cycle is approximately 50%.

10. The method according to claim 1, wherein said synchronization signals, when they are to be transmitted, are transmitted onto said media at the same cyclical point in time.

11. The method according to claim 1, wherein said synchronization signals, when they are to be transmitted, are transmitted onto said media at the same cyclical point in time before the body of a frame is transmitted.

12. A media access controller for controlling access by a node to a media connected thereto, comprising:

a synchronization signal generator adapted to randomly transmit, on a frame by frame basis, a synchronization signal onto said media within a synchronization time slot;

a synchronization mechanism adapted to achieve synchronization between a particular node and other nodes, said synchronization mechanism operative to control the generation of said synchronization signal by said synchronization signal generator;

a timing mechanism operative to produce a timing signal derived from a plurality of received synchronization signals;

a frame occupation signal generator adapted to periodically transmit a frame occupation signal within a media busy time slot once said node obtains access to said media for indicating that the next frame is occupied; and a media access controller for coordinating access to said media, wherein access to said media is not permitted as long the presence of a frame occupation signal is detected on said media.

13. The controller according to claim 12, further comprising a transmit/receive interface adapted to interface said media access controller to transmit circuitry and receive circuitry.

14. The controller according to claim 12, further comprising a transmit/receive controller adapted to manage the transmission and reception of data between an application processor and transmit circuitry and receive circuitry.

15. The controller according to claim 12, wherein said timing mechanism is adapted to average the timing of a plurality of individual synchronization signals transmitted by other nodes.

16. The controller according to claim 15, wherein said averaging is achieved by the averaging the output of a matched filter adapted to said synchronization signal.

17. The controller according to claim 12, wherein said synchronization mechanism comprises processing means operative to:

listen to the media for a predetermined length of time while attempting to detect synchronization signals from other nodes;

if synchronization signals are detected, derive a timing signal from said synchronization signals;

align the clock in a particular node in accordance with said timing signal;

randomly transmit, on a frame by frame basis, synchronization signals onto said media within a synchronization time slot;

maintain synchronization with other nodes by listening to said media for synchronization signals transmitted by other nodes when said synchronization signal is not transmitted within said synchronization time slot;

if synchronization signals are not detected, randomly transmit, on a frame by frame basis, synchronization signals onto said media within said synchronization time slot and wait for other nodes to join said network; and maintaining said media in an occupied state once synchronization is achieved by periodically transmitting a frame occupation signal within a media busy time slot indicating to all other nodes that the next frame is occupied.

18. The controller according to claim 12, wherein said frame occupation signal generator is adapted to periodically transmit said frame occupation signal onto said media at the same point in time.

19. A method of converging disparate synchronization from a plurality of networks, said method comprising the steps of:

listening for synchronization signals transmitted from each network;

if more than one synchronization signal is detected, transmitting a synchronization signal shifted in time for each group of synchronization signals detected;

nodes in each network capable of detecting said shifted synchronization signals adjusting their synchronization timing in response to said shifted synchronization signals; and repeating said steps of transmitting and adjusting until unified synchronization is achieved among said plurality of networks.

20. The method according to claim 19, wherein said step of listening is performed at least upon wake-up of a node.

21. The method according to claim 19, wherein said synchronization signal comprises a sequence of single tone pulses, each pulse having a different frequency.

22. The method according to claim 19, wherein said synchronization signal comprises a wide band bi-phase sequence.

23. The method according to claim 22, wherein the each node is adapted to transmit a different bi-phase sequence.

24. The method according to claim 22, wherein said wide band bi-phase sequence is adapted to have good autocorrelation properties.

25. The method according to claim 19, wherein said step of adjusting comprises providing a phase lock loop adapted to maintain synchronization of a clock with synchronization signals received from other nodes.

26. The method according to claim 19, wherein said step of transmitting comprises the step of selecting a number at random and transmitting said synchronization signal if the number selected is less than a predetermined threshold number chosen, wherein said predetermined threshold number corresponds to a desired duty cycle.

27. The method according to claim 26, wherein said duty cycle is approximately 50%.

28. The method according to claim 19, wherein said synchronization signals, when they are to be transmitted, are transmitted onto said media at the same cyclical point in time.

29. The method according to claim 19, wherein said synchronization signals, when they are to be transmitted, are transmitted onto said media at the same cyclical point in time before the body of a frame is transmitted.

30. A node connected to a media, comprising:

a media coupling circuit adapted to electrically interface said node to said media;

an application processor for executing an application program;

a media access controller comprising:

a synchronization signal generator adapted to randomly transmit, on a frame by frame basis, a synchornization signal onto said media within a synchronization time slot;

a synchronization mechanism adapted to achieve synchronization between a particular node and other nodes, said synchronization mechanism operative to control the generation of said synchronization signal by said synchronization signal generator;

a timing mechanism operative to produce a timing signal derived from a plurality of received synchronization signals;

frame occupation signal generator adapted to periodically transmit a frame occupation signal within a media busy time slot once said node obtains access to said media for indicating that the next frame is occupied; and a media access controller for coordinating access to said media, wherein access to said media is not permitted as long as the presence of a frame occupation signal is detected on said media;

a transmit circuit adapted to receive a data stream from said media access controller the transmission onto said media; and a receive circuit adapted to output a data stream received over said media to said media access controller.

31. The controller according to claim 30, wherein said timing mechanism is adapted to average the timing of a plurality of individual synchronization signals transmitted by other nodes.

32. The controller according to claim 31, wherein said averaging is achieved by time averaging the output of a matched filter adapted to said synchronization signal.

33. The controller according to claim 30, wherein said synchronization mechanism comprises processing means operative to:

listen to the media for a predetermined length of time while attempting to detect synchronization signals from other nodes;

if synchronization signals are detected, derive a timing signal from said synchronization signals;

align the cock in a particular node in accordance with said timing signal;

randomly transmitting, on a frame by frame basis, synchronization signals onto said media within a synchronization time slot;

maintain synchronization with other nodes by listening to said media for synchronization signals transmitted by other nodes when said synchronization signal is not transmitted during said specific points in time and detecting synchronization signals transmitted by other nodes;

if synchronization signals are not detected, randomly transmit, on a frame by frame basis, synchronization signals onto said media within said synchronization time slot and wait for other nodes to join said network; and maintaining said media in an occupied state once synchronization is achieved by periodically transmitting a frame occupation signal within a media busy time slot indicating to all other nodes that the next frame is occupied.

34. The controller according to claim 30, wherein said frame occupation signal generator is adapted to periodically transmit said frame occupation signal onto said media at the same point in time.

35. In a network including a plurality of nodes, a method of media access control for achieving coexistence of disparate nodes located in a plurality of groups, said method comprising the steps of:

allocating a synchronization time slot within frames associated with each group of disparate nodes, said synchronization time slot dedicated to the transmission of synchronization signals;

allocating a frame occupation time slot within said frames, said frame occupation time slot dedicated to the transmission of frame occupation signals;

each node inserting a synchronization signal on a predetermined basis during said synchronization time slot;

each node able to detect synchronization signals from at least one other group, generating converged a synchronization signal skewed toward a converged timing derived therefrom;

if the timing of said synchronization signals from other groups is sufficiently far apart, transmitting, by a middle node capable of hearing transmissions from other groups, multiple synchronization signals, each corresponding to a respective detected synchronization signal wherein synchronization signals are shifted in time so as to cause the timing of said plurality of groups to converge;

each node listening for the presence of frame occupation signals to determine whether said media is available; and once a node detects said media is available, securing said media by transmitting said frame occupation signal during said frame occupation time slot.

36. The method according to claim 35, wherein portions of said plurality of nodes run different protocols.

37. The method according to claim 35, wherein portions of said plurality of nodes have different physical layers.

38. The method according to claim 35, wherein said synchronization signal comprises a sequence of single tone pulses, each pulse having a different frequency.

39. The method according to claim 35, wherein said synchronization signal comprises a wide band bi-phase sequence.

40. The method according to claim 39, wherein the each node is adapted to transmit a different bi-phase sequence.

41. The method according to claim 39, wherein said wide band bi-phase sequence is adapted to have good autocorrelation properties.

42. The method according to claim 35, wherein said step of transmitting comprises the step of selecting a number at random and transmitting said synchronization signal if the number selected is less than a predetermined threshold number chosen, wherein said predetermined threshold number corresponds to a desired duty cycle.

43. The method according to claim 42, wherein said duty cycle is approximately 50%.

* * * * *